United States Patent
Semenov et al.

(10) Patent No.: US 11,544,088 B1
(45) Date of Patent: *Jan. 3, 2023

(54) SYSTEM AND METHOD FOR PROVIDING A CUSTOMIZED GRAPHICAL USER INTERFACE BASED ON USER INPUTS

(71) Applicant: PARALLELS INTERNATIONAL GmbH, Schaffhausen (CH)

(72) Inventors: Pavel Semenov, Moscow (RU); Nikolay Dobrovolskiy, Moscow (RU); Serguei Beloussov, Singapore (SG); Liubov Kulakova, Moscow (RU); Ivan Korobov, Moscow (RU); Ruslan Sadovnikov, Moscow (RU)

(73) Assignee: Parallels International GmbH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/483,268

(22) Filed: Sep. 23, 2021

Related U.S. Application Data

(63) Continuation of application No. 15/822,279, filed on Nov. 27, 2017, now Pat. No. 11,169,831.

(51) Int. Cl.
| | |
|---|---|
| *G06F 3/01* | (2006.01) |
| *G06F 9/451* | (2018.01) |
| *G06F 3/04886* | (2022.01) |
| *G06F 3/0482* | (2013.01) |
| *H04L 67/141* | (2022.01) |
| *H04L 67/75* | (2022.01) |
| *H04L 67/01* | (2022.01) |
| *H04L 67/50* | (2022.01) |

(52) U.S. Cl.
CPC ............ *G06F 9/452* (2018.02); *G06F 3/0482* (2013.01); *G06F 3/04886* (2013.01); *H04L 67/141* (2013.01); *H04L 67/75* (2022.05); *H04L 67/01* (2022.05); *H04L 67/535* (2022.05)

(58) Field of Classification Search
None
See application file for complete search history.

(56) References Cited

U.S. PATENT DOCUMENTS

| | | | |
|---|---|---|---|
| 7,360,175 B2 * | 4/2008 | Gardner ................ | G06F 3/0482 715/825 |
| 7,987,432 B1 * | 7/2011 | Grechishkin ............ | G09G 5/14 715/781 |

(Continued)

*Primary Examiner* — Maikhanh Nguyen
(74) *Attorney, Agent, or Firm* — Rosenberg, Klein & Lee

(57) ABSTRACT

A system and method that provides customized graphical user interfaces on mobile devices based on user inputs. An exemplary method includes detecting a computing device remotely connected to a remote server over a network and having an active session of a software application running on the remote server. Moreover, the method further includes identifying and selecting one or more hotkey buttons based on the detected software application, transmitting the one or more hotkey buttons to the computing device to be displayed in a customized interface while the software application is active, detecting an activation of the one or more hotkey buttons displayed on the computing device, and executing, by the remote server, an operation for the active software application in response to the activation of the one or more hotkey button by the user.

6 Claims, 7 Drawing Sheets

(56) References Cited

U.S. PATENT DOCUMENTS

| | | | | |
|---|---|---|---|---|
| 8,307,358 | B1* | 11/2012 | Koryakina | G06F 9/45533 718/1 |
| 8,387,048 | B1* | 2/2013 | Grechishkin | G06F 9/445 718/1 |
| 8,732,607 | B1* | 5/2014 | Grechishkin | G06F 3/0484 718/1 |
| 8,880,569 | B2* | 11/2014 | Draper | G06F 16/242 707/805 |
| 9,225,611 | B1* | 12/2015 | Bagrinovskiy | G06F 3/0488 |
| 9,317,195 | B1* | 4/2016 | Grechishkin | G06F 3/04842 |
| 9,400,801 | B1* | 7/2016 | Aplemakh | G06F 16/183 |
| 9,426,257 | B1* | 8/2016 | Pashkov | H04L 67/08 |
| 9,485,290 | B1* | 11/2016 | Kolomeitsev | H04L 67/125 |
| 9,535,567 | B1* | 1/2017 | Bagrinovskiy | G06F 3/14 |
| 9,804,872 | B1* | 10/2017 | Ozerov | G06F 9/451 |
| 2005/0125745 | A1* | 6/2005 | Engestrom | G06F 3/0482 715/847 |
| 2008/0235789 | A1* | 9/2008 | Erwin | G06F 16/954 726/19 |
| 2008/0288874 | A1* | 11/2008 | Hoyle | G06Q 30/0269 715/738 |
| 2009/0158213 | A1* | 6/2009 | Ryu | H04M 1/72466 715/810 |
| 2011/0239144 | A1* | 9/2011 | Rapp | G06F 8/38 715/764 |
| 2011/0246904 | A1* | 10/2011 | Pinto | G06F 9/452 715/740 |
| 2011/0320957 | A1* | 12/2011 | Tiddens | G06F 9/45512 715/747 |
| 2012/0084713 | A1* | 4/2012 | Desai | G06F 9/452 715/788 |
| 2014/0304639 | A1* | 10/2014 | Huang | H04M 1/72466 715/773 |
| 2015/0220239 | A1* | 8/2015 | Kay | G06F 3/0482 715/745 |
| 2016/0334881 | A1* | 11/2016 | Kong | G06F 3/0488 |
| 2016/0334983 | A1* | 11/2016 | Lee | H04N 5/232933 |

* cited by examiner

SYSTEM AND METHOD FOR PROVIDING A CUSTOMIZED GRAPHICAL USER INTERFACE BASED ON USER INPUTS

CROSS-REFERENCE TO RELATED APPLICATIONS

This application claims the benefit of priority as a continuation of U.S. patent Ser. No. 15/822,279 filed Nov. 27, 2017; the entire contents of which are incorporated herein by reference.

TECHNICAL FIELD

The present disclosure generally relates to graphical user interfaces on computer displays, and, more particularly, to a system and method for providing a customized graphical user interface based on user inputs.

BACKGROUND

As mobile devices and other electronic appliances continue to develop with increasingly powerful processing capabilities and dynamic touchscreen displays, the software applications available on these devices also continues to get more complex. However, with these increasingly complex software applications comes a significant complexity in the number of keystrokes and other various inputs for users to interact with these applications, especially in the context of electronic gaming, for example. Moreover, while the processing abilities continue to increase for such mobile devices, the complex sequences of user interaction within such software application environments still consume significant processing resources.

Therefore, a customized and easy interface is still needed enabling users to easily and quickly interact with such sophisticated software applications. Moreover, it is desired to provide a system and method that minimizes resource consumption by the end client device.

SUMMARY

Accordingly, a system and method is provided a customized graphical user interface based on user inputs. An exemplary method includes detecting, by a remote server, a computing device remotely connected to the remote server over a network and having an active session of a software application running on the remote server; identifying and selecting, in a hotkey database of the remote server, at least one hotkey button based on the detected active session of the software application on the computing device; transmitting, by the remote server, the identified and selected at least one hotkey button to the computing device to be displayed in a customized interface on a display screen thereon in connection with the active session of the software application; detecting, by the remote server, an activation of the identified and displayed at least one hotkey button by a user of the computing device; and executing, by the remote server, an operation for the software application running on the remote server in response to the activation of the identified and displayed at least one hotkey button by the user.

According to another exemplary aspect, the method includes analyzing, by the remote server, combinations of input sequences received from a plurality of computing devices running active sessions of the software application; generating, by the remote server, the at least one hotkey button based on respective frequencies of the combinations of input sequences; and storing, by the remote server, the generated the at least one hotkey button in the hotkey database.

According to another exemplary aspect, the method includes detecting, by the remote server, a new computing device having another active session of the software application; determining device parameters of the new computing device that include a device type and touchscreen input dimensions of the new computing device; selecting, by the remote server, the at least one hotkey button stored in the hotkey database based on the device type and touchscreen input dimensions of the new computing device; and transmitting, by the remote server, the selected at least one hotkey button to the new computing device to be presented as a customized interface on a display screen in connection with the active session of the software application.

According to another exemplary aspect, the identifying and selecting, by the remote server, of the at least one hotkey button based on the detected active session of the software application comprises identifying the hotkey button based on device parameters of the computing device including a device type and touchscreen input dimensions of the computing device.

According to another exemplary aspect, the method includes logging, by the computing device, combinations of input sequences entered by a user of the computing device operating the active session of the software application based on at least one of keystroke modifiers and functional keys selected by the user.

According to another exemplary aspect, the method includes transmitting, by the computing device, the logged combinations of input sequences to the remote server; and generating, by the remote server, the at least one hotkey button based on the logged combinations of input sequences received from the computing device.

According to another exemplary aspect, the method includes determining, by the remote server, device parameters of the computing device; and generating, by the remote server, the at least one hotkey button based on the logged combinations of input sequences received from the computing device and the determined device parameters.

According to another exemplary aspect, the method includes dynamically updating, by the remote server, the at least one hotkey button selected for the active session of the software application based on combinations of input sequences received from other computing devices running other active sessions of the same software application as the computing device; and transmitting, by the remote server, the dynamically updated at least one hotkey button to the computing device to be presented in the customized interface on the display screen in connection with the active session of the software application.

According to another exemplary aspect, the method includes logging, by the computing device, combinations of input sequences entered by the user of the computing device operating the active session of the software application based on at least one of keystroke modifiers and functional keys selected by the user; determining, by the computing device, whether one of the logged combination of input sequences exceeds a predetermined threshold; and identifying and displaying, by the computing device, in the customized interface on the display screen at least one hotkey button that corresponds to the logged combination of input sequences when the predetermined threshold is exceeded.

According to another exemplary aspect of the method, the identified and selected at least one hotkey button displayed in the customized interface on the display screen comprises an expandable menu of a plurality of selectable hotkeys that each correspond to a different selectable combination of input sequences for the software application that is active on the computing device.

According to another exemplary aspect of the method, the expandable menu comprises a first ring having a plurality of user actions associated with the software application and a second ring having the plurality of selectable hotkeys that is displayed on the customized interface upon the user selecting at least one of the plurality of the user actions in the first ring.

In yet another aspect, a system provides a customized graphical user interface based on user inputs. In this aspect, the system includes a hotkey database configured to store at least one hotkey button for a software application; and a remote server with a processor configured to detect a computing device that is remotely connected to the remote server over a network and that has an active session of the software application running on the remote server, identify and select, in the hotkey database, at least one hotkey button based on the detected active session of the software application on the computing device, transmit the identified and selected at least one hotkey button to the computing device to be displayed in a customized interface on a display screen thereon in connection with the active session of the software application, detect an activation of the identified and displayed at least one hotkey button by a user of the computing device, and execute an operation for the software application running on the remote server in response to the activation of the identified and displayed at least one hotkey button by the user.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
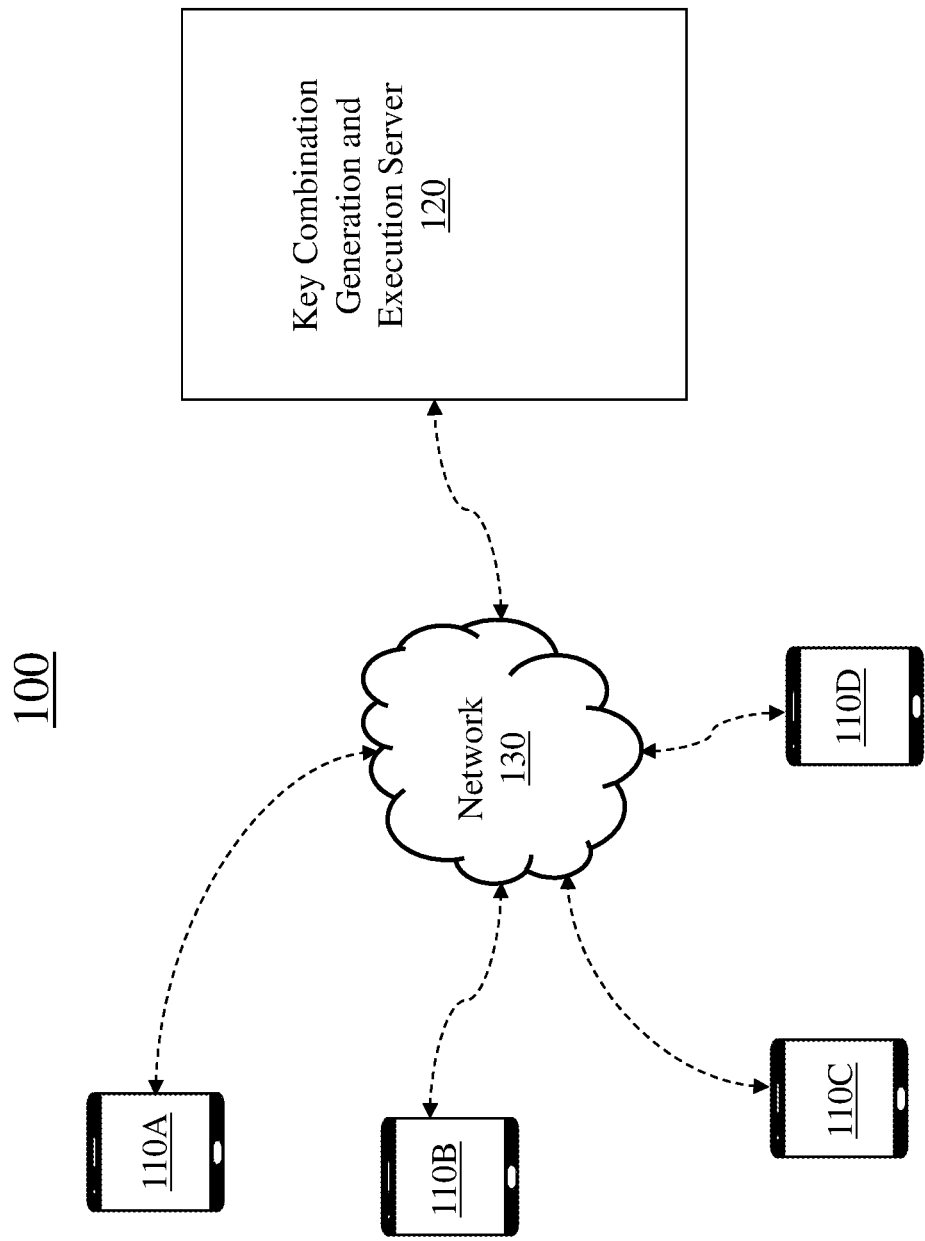
FIG. 1 illustrates a block diagram of a system 100 for providing a customized graphical user interface based on user inputs according to an exemplary aspect.

Various aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a simplified summary of one or more aspects in order to provide a basic understanding of the aspects. This summary is not an extensive overview of all contemplated aspects, and is not intended to identify key or critical elements of all aspects nor delineate the scope of any or all aspects.

FIG. 1 illustrates a block diagram of a system 100 for providing a customized graphical user interface based on user inputs according to an exemplary aspect. As shown, the system 100 is generally comprised of one or more client devices 110A-110D, a key combination generation and execution server 120 (hereinafter referred to as "server" or "remote server" 120) and a network 130 that communicatively couples the client devices 110A-110D to server 120. According to the exemplary aspect, the client devices 110A-110D are each a mobile computing device, such as a smartphone or tablet, for example. It is well known to those skilled in the art that such mobile devices typically have smaller display screens (relative to conventional desktop personal computers), and, therefore, it can be frustrating or difficult for many users to quickly enter user input operations (e.g., keystroke combinations) using these smaller screens. Thus, as will be readily apparent from the disclosure herein, the exemplary system and method enable the user(s) of each mobile device 110A-100D to quickly and easily input user operations using a customized graphical user interface provided on the respective display screens of each mobile device.

It should also be appreciated that while mobile devices are described as the client devices 110A to 110D according to the exemplary aspect, the exemplary system and method described herein can be provided for any type of computing device, such as a desktop, laptop or the like, as would be appreciated to one skilled in the art. Moreover, while only four client devices 110A-110D are shown according to the exemplary system 100, it is noted that the exemplary system and method can be provided for any number of client devices. Moreover, in one aspect, a large number of client devices (e.g., 100 or even 1000 or more mobile devices) provide more analysis points for the server 120 to evaluate user inputs and generate "hotkeys" as will be described in more detail below.

As noted above, each client device 110A-110D of the system 100 is configured to communicate data across one or more networks 130 to server 120 according to the exemplary aspect. The applicable network 130 can be any network for communicating data and data operations and can include one or more specific communication systems (not shown) that connect the various components of the system 100 by wire, cable, fiber optic, and/or wireless links facilitated by various types of well-known network elements, such as hubs, switches, routers, and the like. It should be appreciated that the network 130 may employ various well-known protocols to communicate information amongst the network resources. In one aspect, the network 130 can be part of the Internet or intranet using various communications infrastructure such as Ethernet, Wi-Fi, mobile telecommunication networks, and the like.

According to the exemplary aspect, each client device 110A to 110D is configured to install a client/server application (e.g., Parallels® Remote Application Server Client) on the device that is configured to communicate via network 130 with the server 120. In turn, server 120 can be an application server (e.g., Parallels® Remote Application Server) that, among other things, provides the functions of key combination (i.e., "hotkey") generation and execution and can operate in a coordinate manner with the client/server application installed on each client device 110A-110D, as will be described in more detail below.

In the exemplary aspect, remote server 120 is configured to generate and provide customized button(s) (referred to as "hotkeys") that can be customized and configured to be displayed on each specific client device enabling the respective user of the device to perform frequently used key combinations using the hotkey presented on the customized interface. For example, in an exemplary aspect, these button(s) may represent shortcuts of controls selected for different applications, threads or combinations of keystrokes, or the like.

In one aspect, the client/server application that is running on a client device (e.g., one or more of client devices 110A-110D) is configured to maintain a hotkey database of shortcuts received from remote server 120. Thus, during operation, the client/server application can monitor and analyze the combination of such keystrokes and also measure usage frequency for the active user application also running on the client device. When the usage frequency of a particular keystroke combination reaches a certain threshold (which can be configured by the device user or a system administration, for example), the client/server application can query the local hotkey database to determine whether the specific shortcut is already known in the database and can be displayed as a single on-screen element (i.e., actionable hotkey button) with a human readable label and/or icon, which can in turn execute the shortcut as a single user touch action, for example. This label or icon can be displayed automatically in one aspect. In another aspect, the user can be presented with an option as to whether he or she would like to add this shortcut as an on-screen button to facilitate further usage (i.e., for providing the single touch action). Yet further, if the shortcut is not already known in the database, the user can be presented with an option of whether he or she would like to create a new on-screen element, provide it with a customizable name, and the like, which can be added to the local database and saved for further usage.

In yet a further aspect, these identified frequently used combinations can be transmitted/posted from the client/server application on the mobile device to the remote server 120 by network 130. The server 120 is configured to receive these combinations of keystrokes and determine desired/useful key combinations for each client device based on the statistics of which shortcuts are used more frequently in the user applications, for example. When the remote server 120 determines that the shortcut usage frequency for each combination reaches a defined threshold (also configurable by the system administrator, for example), the remote server 120 can generate a suggestion for configuring a new-well known on-screen button (assuming this button has not been previously generated. The newly generated key combination (i.e., "hotkey") button can then be transmitted back to client device and added to the hotkey database, for example. Thus, during subsequent operation, this new hotkey can be presented on the user display as a form of a customized graphical user interface ("GUI") using the process described above.

Furthermore, in the exemplary aspect, the server 120 may be remotely running the application for one or more of the client devices 110A-110D, such that each client device can run an active session of the remote software application that is primarily executed by the remote server 120. Upon receiving a user input of a key combination button on the client device, the button input/activation can be transmitted back to the server 120 for execution of the operations associated with the hotkey button. By doing so, the exemplary system 100 can provide higher security and hardware independence for the client devices 110A-110D according to an exemplary aspect. The details and advantages of the system 100 will now be described as follows.

Figure 2:
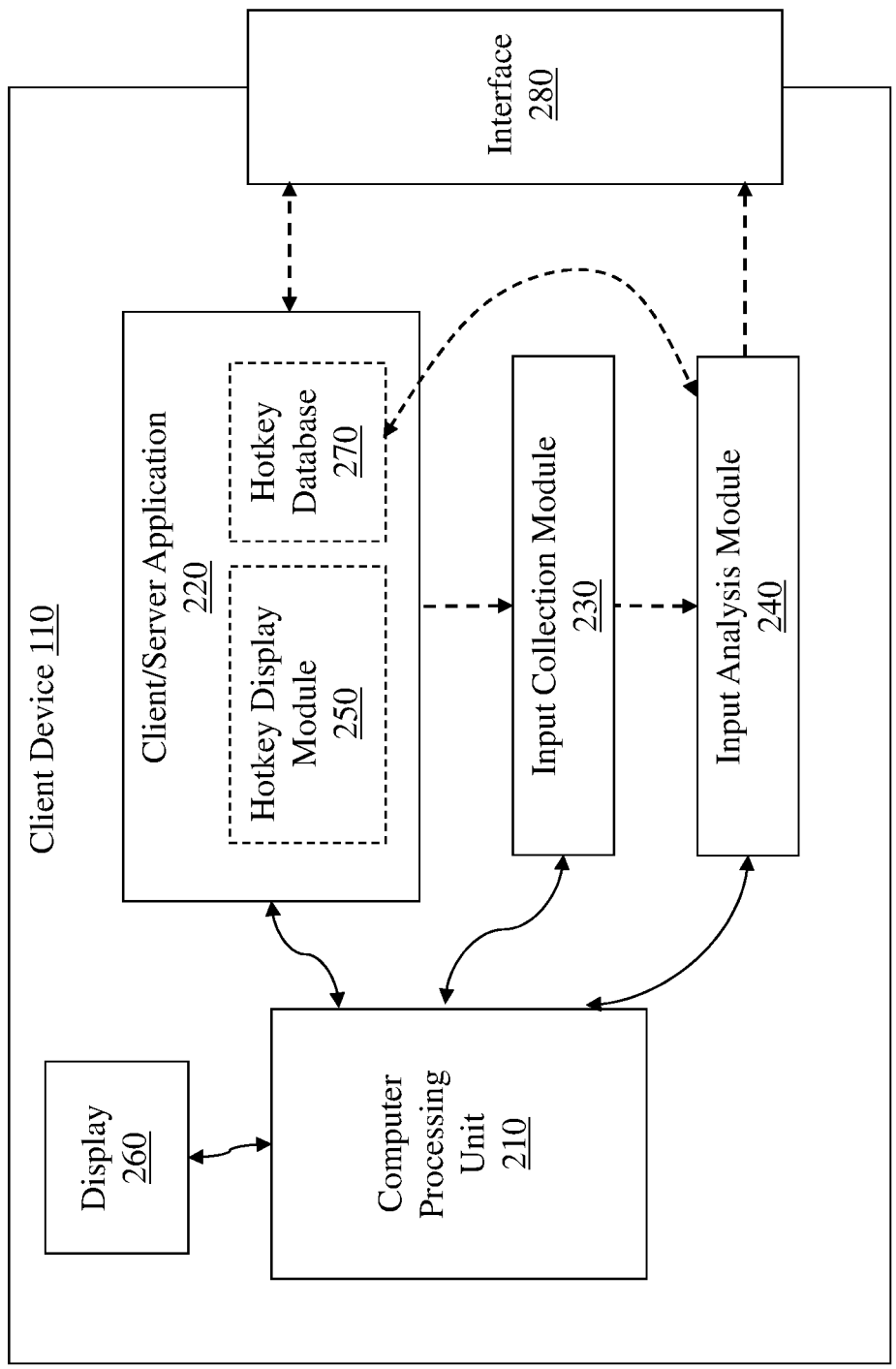
FIG. 2 illustrates a block diagram of a client device 110 for providing a customized graphical user interface based on user inputs according to an exemplary aspect.

FIG. 2 illustrates a block diagram of a client device 110 for providing a customized graphical user interface based on user inputs according to an exemplary aspect. Client device 110 generally represents any one of client devices 110A to 110D described above. In general, client device 110 can be any type of mobile device, for example, and will include an operating system and a central processing unit ("CPU") 210 provided to, among other things, execute client/server application 220, which as noted above can be Parallels® Remote Application Server Client, for example. In this aspect, the client/server application 220 can be downloaded from server 120 and installed and includes software code (e.g., processor executable instructions) in memory, which may be configured to execute/facilitate the key combinations on the customized GUI of the client device 110 according to the exemplary aspects described herein.

According to an exemplary aspect, the client/server application 220 downloaded on client device 110 is configured to execute a plurality of module, including input collection module 230 and input analysis module 240. These modules may be part of client/server application 220 in one exemplary aspect or separate software component(s) according to another exemplary aspect. As used herein, the term "module" refers to a software service or application executed on one or more computers, including client devices 110A-110D, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein. For purposes of this disclosure below with respect to the exemplary algorithms, the disclosure generally refers to the client device 110 and/or CPU 210 and/or one of the specific modules as shown to perform the various steps of the algorithm.

As is the case for all mobile devices, client device 110 is generally configured to execute and/or provide a plurality of software applications for the user of the client device 110. For example, as described above, the client/server application 220 can be provided by server 120, as a remote application server that remotely provides software applications (e.g., a remote desktop and remote gaming environment, etc.) on client device 110. In this configuration, the server 120 remotely executes the desired application for the client device 110, which is then transmitted and displayed on the client device 110 over network 130, as should be appreciated to one skilled in the art. For example, in one particular aspect, the server 120 can provide a "game mode" that allows a user of client device 110 to conveniently play desktop games by the customized GUI presented on the display 260 (e.g., LCD screen) on the client device 110, where the game is running on a remote session by server 120.

In the exemplary aspect, the input collection module 230 is activated by client/server application 220, for example, and is configured to receive keyboard and/or mouse inputs from the user of the client device 110 running the remote application. Assuming the client device 110 is a mobile device, such as an iPhone®, for example, the input collection module 230 is configured to monitor and track/record inputs of the electronic keyboard (or other movement/touch strokes) input by the user via the user interface of the application that is presented on display 260 of the device 110. In this aspect, the input collection module 230 is configured to log the usage of key combinations, and the like, and associate them with the particular type of client device and also for the current active application, in which the user of the client device 110 is working, playing, etc. In one aspect, these "hotkeys" can be tracked when the user selects one or more modifier keys with a regular (i.e., non-modifier) key. Modifier keys can be, for example, one or more of: "ctrl", "alt", "shift", "altGr", "win", "command", "Fn", "media keys", or the like. Moreover, the client device 110 can determine the current active application from the software agent installed on the remote server 120, for example.

According to the exemplary aspect, the selection of one of the modifier keys by the user activates the input collection module 230 to begin collecting the keystroke combinations, for example. In other aspects, the input collection module 230 can continuously monitor any non-letter keystroke inputs, for example, and log combinations. In one aspect, if a user is playing a game, the input collection module 230 can monitor particular keystroke sequences of arrow inputs relevant to the game. In another aspect, if the user is playing a game, such as a combat game or first person shooter game, the collection module 230 can monitor particular combinations of action strokes required to perform a particular action in the game. For example, a specific combination of directional swipes on the touchscreen of the display 260 may be required to perform a particular fighting combination move in a game. The collection module 230 is configured to track the repeated combination of such direction strokes in this aspect.

Moreover, the information collected and logged by the input collection module 230 can be provided to analysis module 240 in the exemplary aspect. In turn, analysis module 240 is configured to analyse and compare the collected data, including client device type (e.g., model and operating software version), specific application(s) running, keystroke combination, and frequency of use. As the analysis module 240 detects shortcut combinations, the analysis module 240 can store them as local records, where each record contains the shortcut key sequence, a timestamp when the shortcut has been detected, and an active remote application identifier (i.e., which application was running when the user entered the keystroke combination). Having those records, the analysis module 240 can also calculate how many times a specific keystroke combination (i.e., a shortcut) has been activated in a given active application during a predefined time frame, which can be defined the device user and/or by an administrator of the client/server application 220, for example. This calculation can be used to determine a shortcut usage frequency for a given keystroke combination.

As further described above, a hotkey database 270 can be downloaded from remote server 120 and stored on the client device 110. In one aspect, the downloaded hotkey database 270 can be synchronized with a current hotkey database maintained by the remote server 120 to receive the best or optimal hotkeys for a given user application installed on the client device 110. Moreover, when a measured shortcut usage frequency for a given keystroke combination exceeds a given threshold (e.g., 5 instances of the keystroke combination in one minute), the analysis module 240 can query the hotkey database 270 to determine whether the specific shortcut is already known in this local database 270. If so, the CPU 210 can cause a single on-screen element with a human readable label and/or icon that corresponds to the identified hotkey to be displayed on display 260 of the client device 110 while the specific user application is "active" (i.e., currently being operated by the user). This single on-screen button can be configured to execute the identified keystroke combination upon as a single user touch action during use of the active application. In a refinement of this aspect, the user of mobile device 110 can be presented with an option as to whether he or she would like to add this shortcut as an on-screen button to facilitate further usage (i.e., the single touch action). Yet further, if the shortcut is not already known in the database, the user can be presented with an option of whether he or she would like to create a new on-screen element, provide it with a customizable name, and the like, which can be added to the database 270 and saved for further usage.

Furthermore, the analysis module 240 is configured to cause the collected data (both known and/or new keystroke combinations, for example) to be transmitted to remote server 120 for hotkey identification, statistical analysis and/or hotkey generation according to an exemplary aspect. For example, the collected data can be transmitted at a particular frequency n, for example, periodically such as once a day, or every time before closing connection by the client/server application 220 to the server 120. Moreover, in one refinement of the exemplary aspect, the analysis module 240 is configured to filter the data collected by input collection module 230 and only transmitted relevant (i.e., possible hot keys and keystroke combinations) while not transmitting user inputs that are determined to not be possible keystroke combinations. For example, if a user is typing an email, these types of user inputs will either not be collected by input collection module 230 and/or will not be transmitted by analysis module 240 to server 120. As further shown, client device 110 is configured to transmit the collected and analyzed data across the network 130 using any convention I/O device, Interface 280, such as a network interface controller or the like.

Figure 3:
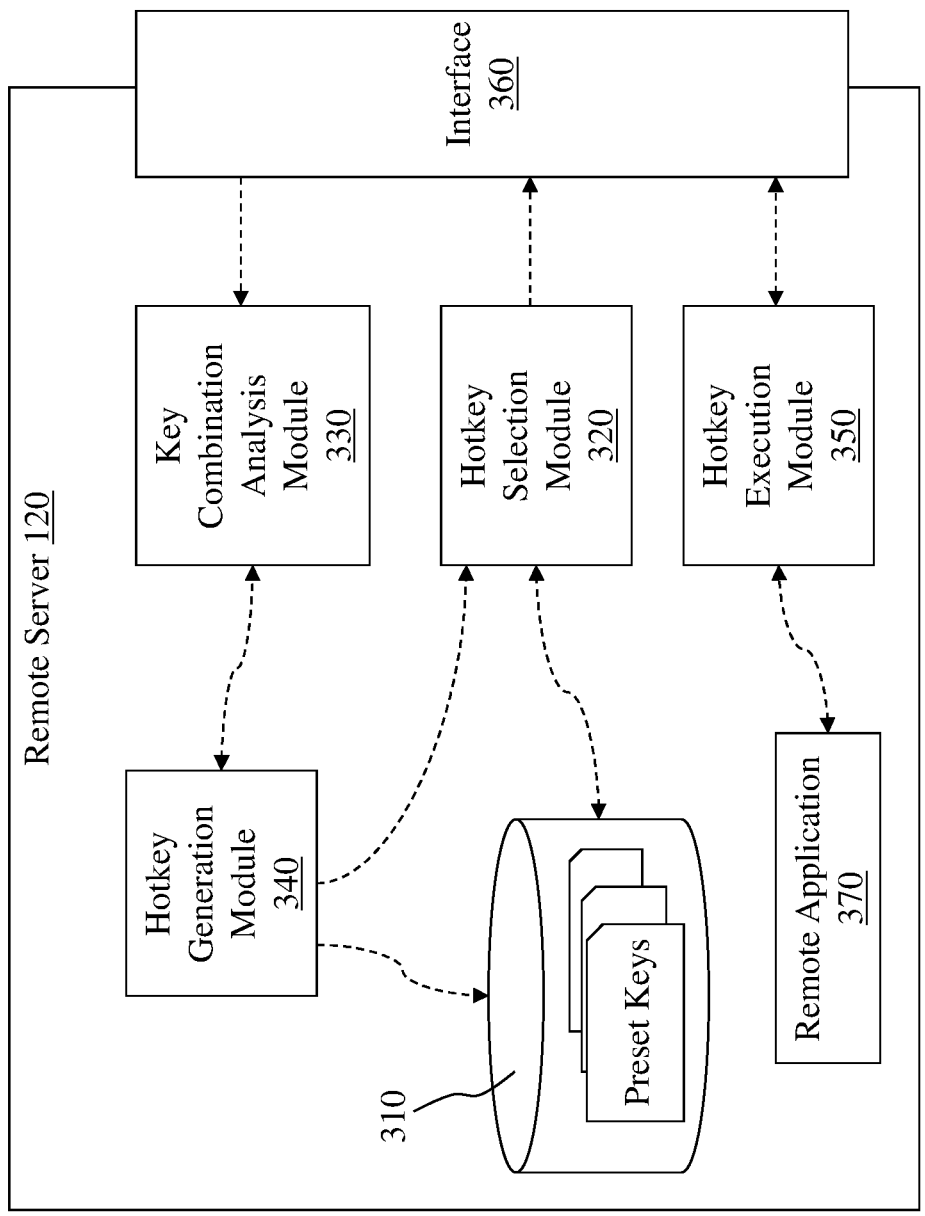
FIG. 3 illustrates a block diagram of a remote server 120 for providing a customized graphical user interface based on user inputs according to an exemplary aspect.

FIG. 3 illustrates a block diagram of a remote server 120 for providing a customized graphical user interface based on user inputs according to an exemplary aspect. In general, server 120 includes a database 310 of hotkey buttons, a plurality of modules configured to perform the exemplary algorithms described herein, and I/O interface 360 configured to communicate with the plurality of client devices 110A-110D over network 130, as described above. Although not shown, it should be appreciated that the server 120 is configured to execute applications and the software modules described herein and includes the necessary hardware and software components that would be known to one skilled in the art, such as one or more computer processing units, for example.

In one exemplary aspect, the database 310 is configured to store a plurality of custom on-screen controls, such customized buttons for keyboard stroke combinations, mouse stroke combinations, touchscreen combinations, joysticks movement combinations, and the like. The remote server 120 further includes a hotkey selection module 320 that is configured to select particular hotkey buttons, from hotkey database 310, for example, to be provided to a client device running a particular client/server application and being run on a particular device. These customized hotkey buttons can be selected and transmitted to the client device 110 when the remote server 120 detects the mobile device's launching/activation of the specific client/server application. Moreover, as described above, the client device 110 can maintain a hotkey database 270 for storing hotkey buttons for the particular applications installed thereon. In this regard, the remote server 120 can synchronize with the client device 110 to identify the active (or frequently used) applications, for example, and download the relevant hotkeys to be stored in the hotkey database 270.

Referring back to FIG. 2, the client/server application 220 further includes a hotkey display module 250 configured to receive and customized hotkey buttons received from server 120 for the particular application. The hotkey display module 250 can cause these buttons to be displayed on display 260, for example, when the user is playing a game application, which enables the user to conveniently play the desktop game that running in a remote session from the remote server 120, using the client device 110, which can be an iPhone or iPad, for example. Thus, when the user interacts with these customized buttons (i.e., activates or clicks the hotkey button displayed on display 260), those interactions are transformed into the desired keys/shortcuts presses, mouse movements/clicks, for the particular application.

It should be appreciated that different game applications require different set of controls to play conveniently, but games of similar genres (e.g., first person shooters, RPGs, strategies, simulators, etc.), often use the same or similar set of keyboard and mouse actions to play. In other words, if one shooter has a certain set of controls, then another shooter most probably has a very similar set of controls, for example. In the exemplary aspect, when client device 110 downloads and installs the client/server application 220, it can be provided with a limited set of predefined on-screen controls (i.e., "pre-sets" or "pre-set hotkeys") in the hotkey database 270, so that the user does not have to setup game controls from the scratch for each and every game. In this aspect, the pre-set hotkeys can either be presented automatically based on the particular game and/or particular device and operating software or the user can select these pre-set hotkeys manually.

It should also be appreciated that as the amount of games is huge and continues to grow, and the various games can differ in terms of "best" on-screen controls configuration, the remote server 120 can figure be configured to add and maintain the pre-set hotkeys centrally at the hotkey database 310, for example. Therefore, in this exemplary aspect, the remote server 120 (e.g., Parallels® cloud or within a serve farm) can store predefined the pre-set hotkeys in hotkey database 310 for on-screen controls for various games/genres. When a user launches a game via the client/server application 220, the identification of the game can be transmitted to remote server 120. If the game is already registered with remote server 120, the server 120 can return the best pre-set hotkeys for the game for hotkey database 270, which can be determined from previous game users using the method described herein, for example. In contrast, if this game is not registered yet, the remote server 120 can further be configured to identify information about the game on the Internet, for example, determine the game's genre, and the like, and return the optimal pre-set hotkeys for the game based on similar games registered with the remote server 120, for example.

Thus, according to an exemplary aspect, the pre-set hotkeys can be updated in the hotkey database 310 when a popular game is released or is about to be released. In addition, the hotkey database 310 can also be updated based on users' pre-sets analysis. This analysis is aimed to find common configuration patterns in pre-sets (e.g., which keys are assigned to on-screen controls, what are the mouse sensitivity settings, etc.) for the same games, and deduce the optimal default pre-set hotkey buttons for each game (or other application). As a result, when a user of a client device 110 launches a particular game for the first time, the remote server 120 will be informed of the launching/activation/installation of the game and will identified the "best known" optimal pre-set hotkeys automatically as described above. Moreover, while the user is playing the particular game (or other application), the input collection module 230 will collect user input controls, for example, if the user customizes the pre-sets, or creates a new pre-set, and have this information sent to remote server 120. This information will enable remote server 120 to dynamically build and update the "best known" pre-set hotkey buttons in the hotkey database 310 for subsequent users of the same game (or other application).

As further shown in FIG. 3, remote server 120 also includes key combination analysis module 330 that is configured to receive the input information collected by the input collection module 230 of the client device 110 and determine the most frequent combinations of keystrokes to determine the best key combinations for hotkeys. For example, this determination can be based on frequency of use of the combinations (compared with other combinations), i.e., the shortcut usage frequency, for the specific application and also the specific type of mobile device (which may include the type of input, size of touchscreen, etc.). The analysed information that can then be provided to hotkey generation module 340 that is configured to generate one or a plurality of hotkey buttons for the particular application (if the hotkey has not already been created). These hotkey buttons generated by hotkey generation module 340 can be stored as software objects in hotkey database 310. Moreover, in one aspect, the remote server 120 is configured to determine and provide hotkey buttons back to client device 110 in real-time (while the application on the device is currently running). As shown, the hotkey selection module 230 is also coupled to receive the output of the hotkey generation module 340. Thus, as hotkey buttons are generated by the hotkey generation module 340, these buttons can be accessed by hotkey selection module 320 and transmitted back to client device 110 to be displayed by hotkey display module 250 in real-time for the running application according to one exemplary aspect.

Otherwise, the generated hotkey buttons can also be stored as software objects in hotkey database 310 and will include metadata associated each generated button with the particular application (or genre of applications, for example), and the particular device. In this aspect, when a different client device subsequently launches the same (or a similar application), the hotkey selection module 320 can identify and transmit the optimal hotkey buttons for this new/activated application as further described above.

As further described above, the remote server 120 may be remotely running the application for one or more of the client devices 110A-110D. These remotes applications are generally shown as remote applications 370, which can be remote desktop applications, remote gaming applications, or the like. Moreover, during operation, the one or more client devices can be configured to run an active session of the remote application 370. As a result, the processing of the software application will be primarily executed by the remote server 120, such that when the user enters inputs (e.g., keystrokes, mouse clicks, press inputs, hotkeys, etc.), these inputs are transmitted to the remote server 120 where they are executed for the remote application 370.

With regard to the exemplary aspect, the remote server 120 further includes a hotkey execution module 350 that is configured to receive the user's input activation of a hotkey button presented on the customized GUI on display 260 of the client device 110 during an active session of the software application. Upon receiving this activation instruction, the remote server 120 is configured to perform the requested key stroke combination (i.e., the input operation) of the particular remote application 370 (as described above), which is also received by the client device 110 in real-time during the execution of the software application by the remote server 120. By doing so, the remote server 120 can provide higher security and hardware independence for the client devices 110, effectively minimizing CPU processing requirements and resource consumption.

As further described above, the remote server 120 is configured to continuously and dynamically build the database 310 of hotkey buttons. In an exemplary aspect, the information (i.e., the keystroke combinations and frequency) can be collected from a plurality of users. For example, this information can be received and analyzed by key combination analysis module 330 from a plurality of associated client device, such as, devices in different companies, different countries, or within RAS Infrastructure of organization for single company, for example. Moreover, the received information can be analyzed key combination analysis module 330 for the frequency of use considering types of applications and type of client devices (other parameters can be taken into account) to determine the optimal hotkey buttons for client devices in a particular group, for example. Thus, as described above, each new user will be provided with the customized hotkey buttons that are optimal for the specific application and for the specific device. The information about the current relevant buttons (and/or the buttons themselves) can be sent to client device 110 with a certain frequency and suggested use, for example.

Figure 4A:
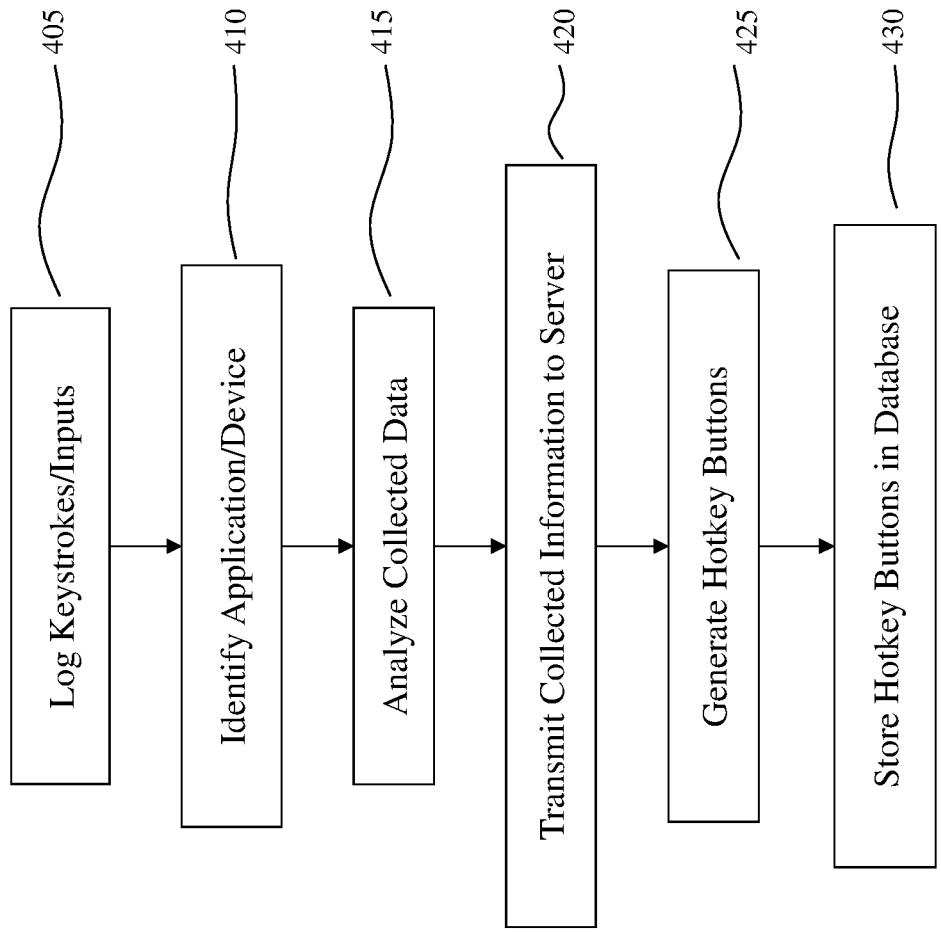
FIGS. 4A and 4B illustrates a flowchart for a method for providing a customized graphical user interface based on user inputs according to an exemplary aspect.
Figure 4B:
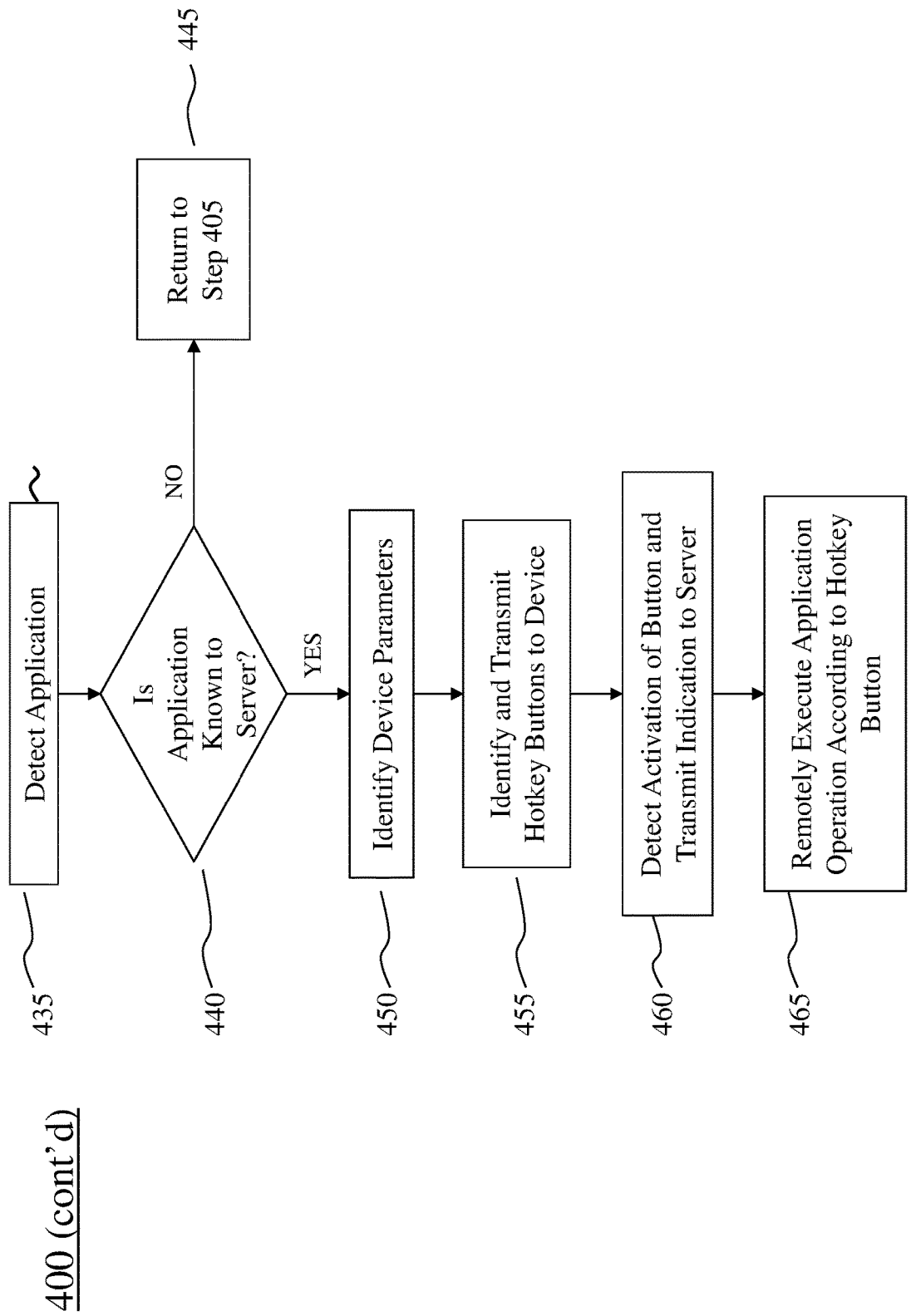

FIGS. 4A and 4B illustrates a flowchart for a method 400 for providing a customized graphical user interface based on user inputs according to an exemplary aspect. As shown, initially at step 405, keystroke combinations and other user inputs (e.g., touch screen swipes, etc.) can be logged by input collection modules 230 for one or a plurality of mobile devices (e.g., client devices 110A-110D). The related data for these applications can then be identified, which includes identifying the specific application and device parameters (e.g., device model, operating system, touchscreen dimensions, input functions, etc.) at step 410. The collected information can then be analyzed at step 415 to identify specific input combinations that are and/or may be preferred keystroke combinations to be used for customized hotkeys. In the exemplary aspect, this initial analysis can be performed by input analysis module 240 of client device 110. In another aspect, the analysis is performed by key combination analysis module 330 of remote server 120. In yet another aspect, the input analysis module 240 of client device 110 performs a first pass to filter out meaningless inputs and then key combination analysis module 330 of remote server 120 performs the more sophisticated analysis of input combinations to determine frequency of most used/important keystroke and input combinations.

In either case, once the input analysis module 240 of client device 110 performs its analysis of the collected data, it is transmitted to server 120 on a periodic basis, for example, at step 420. The remote server 120 is then configured to generate one or more hotkey buttons at step 425 using the algorithms described above. In one exemplary aspect, the key combination analysis module 330 performs this analysis taking into account collected data from a plurality of devices using this information that can be associated with each other by some specific criteria, such as country, company, device type, or the like. Finally, as further shown in FIG. 4A, the generate hotkey buttons can be stored as pre-set hotkey combinations in database 310, for example, at step 430.

FIG. 4B illustrates the providing and execution environment of the hotkey buttons according to an exemplary aspect. As shown, at step 435, the remote server 120 will detect an application (e.g., a remote gaming application) running on a client device 110, for example. In an alternative aspect, the remote server 120 may detect an active session on the client device 110 of the software application (e.g., the remote application) on the remote server 120.

In either case, the remote server 120 will then confirm at step 440 whether the application is known to the server, i.e., whether it has pre-set hotkey combination buttons. If not, the method proceeds to step 445 causing the client/server application 220 of the client device to begin logging input combinations and keystrokes as described above. Otherwise, if the application is known to the server, the remote server 120 will further obtain the device parameters at step 450. These parameters can include the type of device, operating system, screen dimensions, and any other applicable information that can be used to determine the optimal hotkey combination buttons to customize the display of the client device.

As further shown, at step 455, the remote server 120 will identify and transmit the hotkey buttons to the client device. For example, based on the application and device type, the remote server 120 can access hotkey database 310 to identify the one or more optimal buttons to be sent to the client device. These buttons are then displayed on the client device 110 by hotkey display module 250 during the running of the application. During operation, the client/server application 220 will monitor and check for input/activation of the customized hotkey buttons on the display 260 of the client device 110 and transmit indication of the activation to remote serve 120. Finally, at step 465, the remote server 120 will perform the operations based on the activated button for the remote application running on the client device 110 according to the exemplary aspect. As noted above, the exemplary method minimizes resource and computing functions by the client device. Moreover, the customized GUI provided on each client device 110 enables each respective user to have a dynamic and easy experience for the particular application (e.g., remote gaming application) with customized hotkey buttons provide to minimize keystrokes and easily activate commonly used keystroke combinations required for the application.

As described above, the exemplary system and method for providing customized GUI with hotkey buttons can be implemented for any type of software applications, such as games, word processing applications, browsers, and the like. Thus, keystroke combinations can be monitored while these applications are active and being used by the user to identify, display and/or generate new hotkey buttons.

In general, it should be appreciated that the vast majority of applications already provide some type of hotkey combinations that include at least one modifier key (e.g., Shift, Alt/Option, Ctrl, Win/Cmd and the like) and/or functional keys (F1, F2, and the like). As described above, the client/server application 220 (and the related modules) is configured to receive the user input events from a native, third-party, or its own custom keyboard, and to transform these user inputs to key press/release events that can be sent to a remote session. Thus, in the exemplary aspect, when the particular client application is active, it has full visibility on keystrokes received from the user.

Moreover, it is also known that the modifier and functional keys either have specific, well-known, documented key codes (e.g., if the user utilizes a hardware keyboard attached to the device) or those keys are implemented as a custom keys by the client application itself, since native on-screen iOS/Android keyboards, for example, do not have those keys (except for "Shift") so their press/release events can be detected by the client software application easily and efficiently. Therefore, in the exemplary aspect, as keystrokes are processed, the input collection module 230, for example, detects when those "special" keys (e.g., modifier or functional keys) are pressed and which other keys are pressed/released until the "special" keys are released. When all "special" keys are released, the input analysis module 240 can deduce the shortcut from the sequence of key press/release events recorded (i.e., the keystroke combination) as further described above. For example, if the user first presses "Ctrl" and then pressed and released "C", and then releases "Ctrl", the shortcut "Ctrl+C" will be detected by the input analysis module 240. In more complex cases, shortcuts can be comprised from multiple "special" keys, such as "Option+Shift+Command+V" in macOS, for example, which helps to paste a text matching the style of the current document. As further described above, these keystroke combinations can then be compared with hotkey buttons in the hotkey database 270 and/or further transmitted to the remote server for further statistical analysis and hotkey generation as described in detail above.

Moreover, the exemplary aspects described above consider a single on-screen button that can be displayed on the client device 110 for the "active" application, which enables the user to simply touch (or input by a mouse, for example) the single button to execute the otherwise complicated keystroke combination. Thus, as an example, if the user is working on a client device with macOS and Microsoft Word is the active application, the user may often use the text selection (e.g., "Shift+Command+Up Arrow"), while in a Browser application, the user may frequently use the hotkey to switch windows in the current program ("Shift+Command+(~)"). Thus, according to this example, when the user opens the Word document, the button "Text selection" (as a hotkey) can be accessed from the hotkey database and provided to him as part of the customizable display. However, when the user switches to Browser, the button "Text selection" will disappear and the new button "Switch windows" (also accessed from the hotkey database) will be presented to the user in a dynamic manner, for example. Thus, it should be appreciated that when the input analysis module 240 is analyzing the keystroke combinations obtained by the input collection module 230 and referencing them with the hotkey database 270, the input analysis module 240 will only be accessing the specific hotkeys in the hotkey database 270 for the "active" application in an exemplary aspect.

Moreover, although the exemplary aspect described above contemplates a single on-screen button (or a plurality of individual buttons displayed next to each other on the display 260) that is configured to execute a single keystroke combination as a hotkey, the hotkey presented on the user interface of the client device 110 can also be an expandable menu to present a plurality of related hotkey functions in an alternative aspect.

Figure 5:
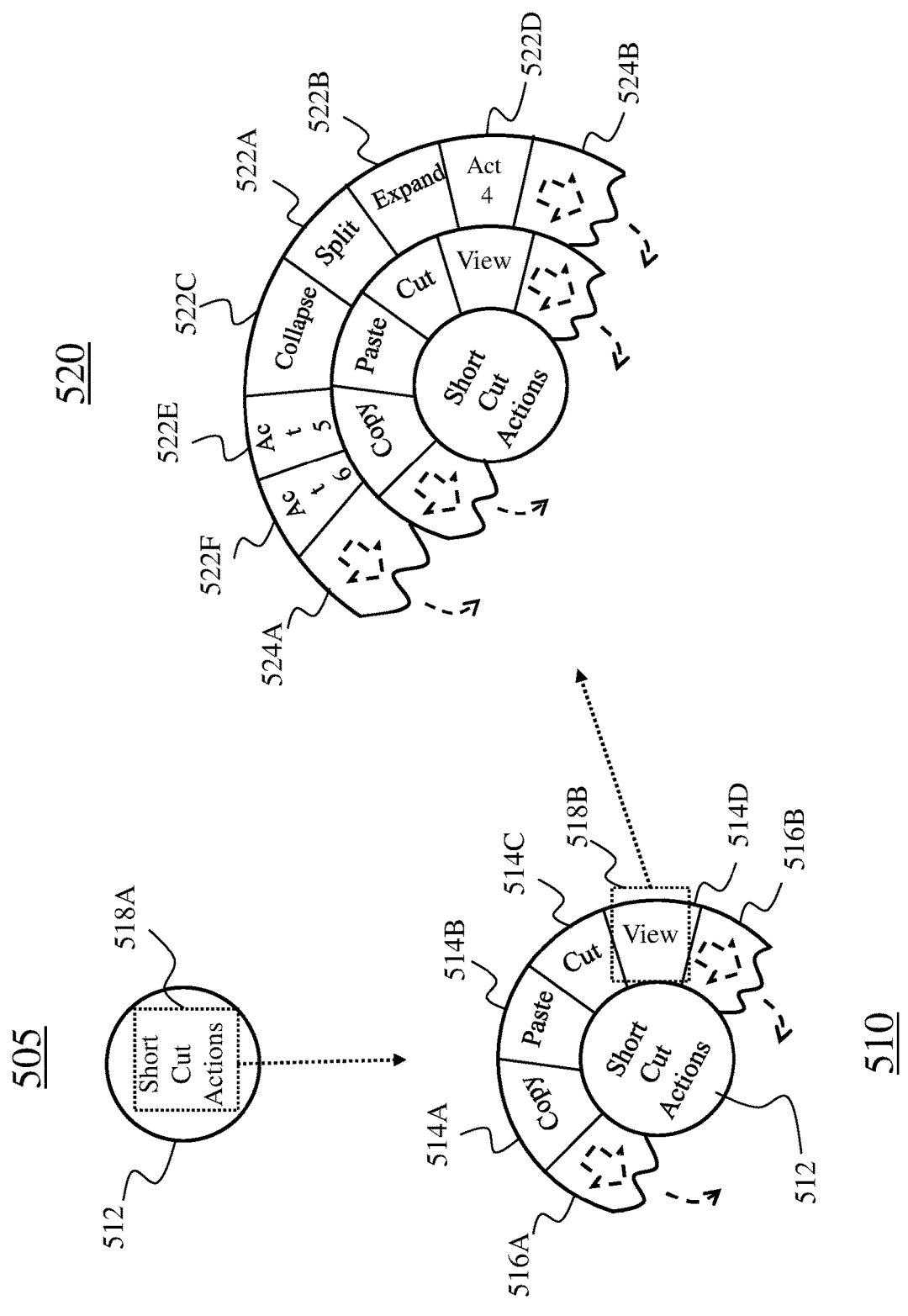
FIG. 5 illustrates a configurable hotkey button displayed on a user interface of a client device according to an additional aspect.

In particular, FIG. 5 illustrates a configurable hotkey button displayed on a user interface of a client device according to an additional aspect. As described above, the system and method described herein is provided to identify the "active" application running on the client device 110. According to this example, it is contemplated that the active or working application is a word processing application, such as Microsoft Word, for example. However, it should be appreciated that such configurable user interface can be provided for any type of user application. The exemplary aspect provides a method for presenting alternative configurable options for the software application (e.g., menu, accelerators, context menu, and the like).

Upon detecting the "active" application, the input analysis module can access the hotkey database 270, for example, and display a single (but expandable) on-screen button, which ultimately provides an adjustable menu of hotkeys. For example, as shown in FIG. 5, the first view 505 of the user interface (e.g., display 260) displays a first button 512 that can be displayed to simply provide the user with the option to access "short cut actions". According to an exemplary aspect, the menu 505 can be contextual (i.e., to be a called button) or to appear depending on the context of the active application. In addition, the dashed box 518A is provided to illustrate a user's first selection to view the first tier (or ring) of customized actions for the active application. That is, upon selection of the button on the customized interface for "short cut actions", the button will be automatically expanded in the display 260 to provide a plurality of additional actions associated with the active application.

In that event, as further shown, a second view 510 is displayed that includes a plurality of different types of actions/elements selected for the active application. In other words, the customized user interface provides a circular representation of the set of actions that provides the user with fast access to a large number of elements of action/sub-actions with a minimum amount of manipulation by the user. According to the example, actions 514A to 514D are shown and correspond to "copy", "paste", "cut" and "view", which are each possible first actions that can be used in the word processing application as would be readily appreciated to one skilled in the art. In addition, the customizable menu/view 510 is shown according to the example as a half circle menu. In this regard, additional view controls 516A and 516B are provided that enable the user to scroll through other possible actions/elements (in addition to actions 514A to 514D) in either a clockwise or counterclockwise manner.

Of course in a refinement of this aspect, the menu with the first of actions/elements can be provided as a full circle with a complete listing of available actions. Such decisions regarding the specific display configurations and dimensions can be tailored based on the screen size and device type of the client device 110 and/or user preferences, for example.

Furthermore, it should be appreciated that the hotkeys presented in this first tier can be selected and presented using the techniques described above. In other words, the remote server 120, for example, can build the customizable interface to include actions 514A to 514D based on the statistics accumulated from a plurality of mobile devices using the application as further described above. Thus, the four actions 514A to 514D can be selected and displayed as the four most frequently used actions for the active application.

As further shown, the view or menu 510 presented on the user interface that is composed of the elements (i.e., the actions 514A to 514D) can be expanded into additional sub-items according to another aspect. Thus, the first menu/view 510 provides a single ring-level of selected actions. When the user selects one of these items, a secondary ring can be opened/expanded and displayed as an additional view, such as menu 520. Thus, in this example, the user has selected the action for "View" 514D (the user's selection is denoted by the dashed box 518B), which expands the menu to view 520. Again, the view 520 is shown as a half circle in order to minimize the size of the customized menu, assuming the application is working on a Tablet or Smartphone, for example. Thus, this menu can also include additional view controls 524A and 524B enabling the user to scroll the available options for actions in either a clockwise or counterclockwise direction.

As further shown in the view 520, a plurality of sub-actions relating to the selected "View" 514D can be displayed. For example, these views can include "Split" 522A, "Expand" 522B, "Collapse" 522C, as well as additional actions "Act 4" 522D, "Act 5" 522E, and "Act 6" 522F. Similarly as described above, the presented actions/elements 522A to 522F can be selected based on the accumulated statistics to provide the most frequently used hotkeys corresponding to the most frequently used keystroke combinations for the active software application. Thus, the selection of these actions/elements can be determined using the principles described above, for example. Based on these actions, the user can select one of the particular actions (e.g., "Split" 522A) which executes the keystroke combination to split the view of the document, which would otherwise require the user to enter a complicated keystroke combination (especially in the context of the application being presented on a device with only a touchscreen such as a Tablet or Smartphone). Thus, the customizable and expandable menu of hotkeys shown in FIG. 5 provides an alternative and additional technique that enables the user to easily and efficiently work with a software application on a device having limited screen size using the principles described herein.

Figure 6:
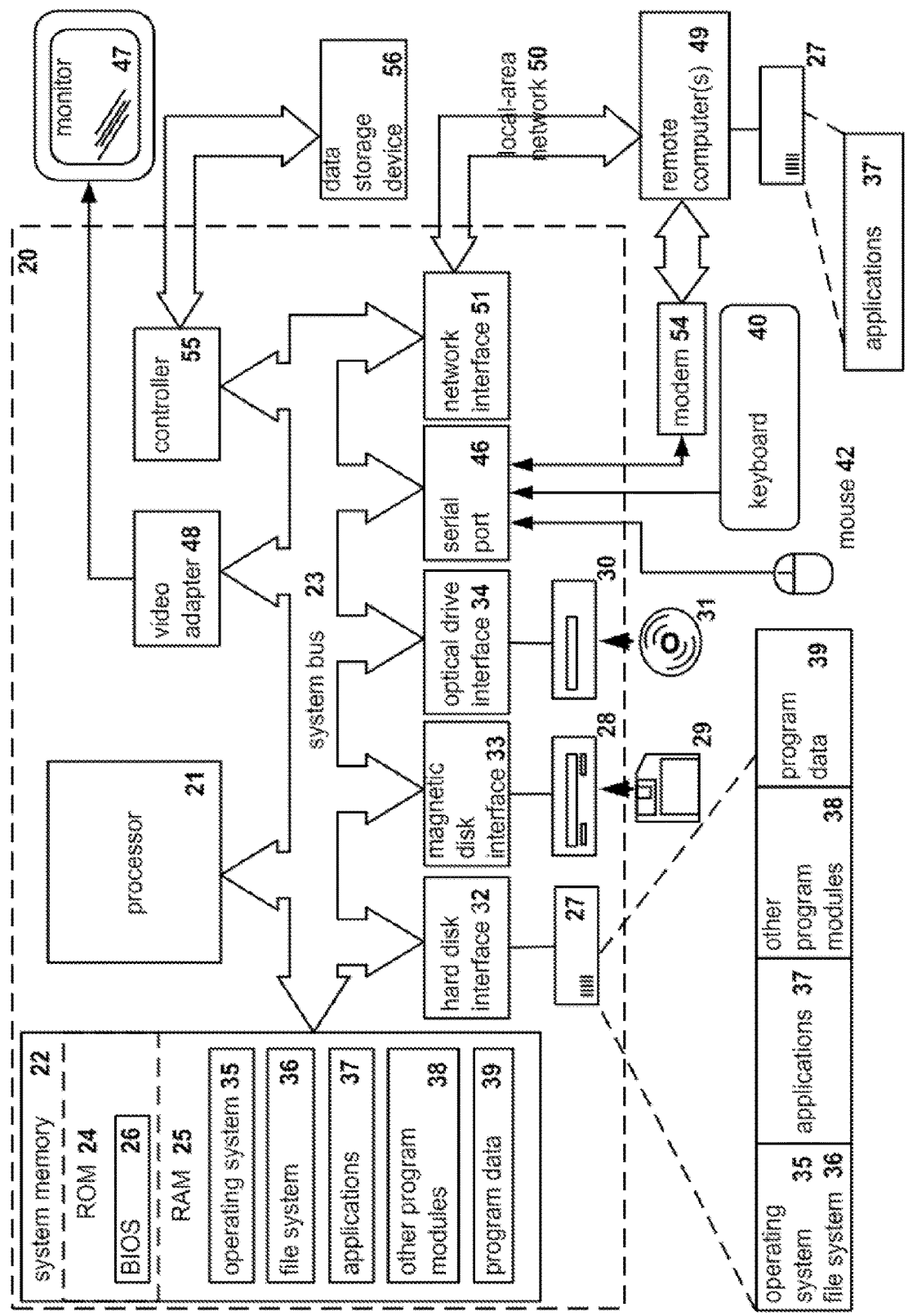
FIG. 6 illustrates a block diagram of an example of a general-purpose computer system (which can be a personal computer or server) on which the disclosed system and method can be implemented according to an example aspect.

FIG. 6 illustrates a block diagram of an example of a general-purpose computer system on which the disclosed system and method can be implemented according to an example aspect. As shown, a general purpose computing device is provided in the form of a computer system 20 or the like including a processing unit 21, a system memory 22, and a system bus 23 that couples various system components including the system memory to the processing unit 21. It should be appreciated that computer system 20 can correspond to client device 110 and/or remote server 120 described above, processing unit 21 can correspond to the CPU 210, system memory 22 can correspond to hotkey database 310 according to various exemplary aspect.

Moreover, the system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 104, such as during start-up, is stored in ROM 24.

The computer 20 may further include the hard disk drive 27 for reading from and writing to a hard disk, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 (which can correspond to display 260) and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server (e.g., servers 24A to 24N), a router, a network PC, a peer device, physical equipment 30 and/or other common network node, and typically includes many or all of the elements described above relative to the computer 20. The logical connections include a network interface 51 and connected to a local area network (i.e., LAN) 51, for example, and/or a wide area network (not shown). Such networking environments are commonplace in offices, enterprise-wide computer networks, Intranets and the Internet. It should be appreciated in one aspect that when computer 20 corresponds to client device 110, remote computer 49 can correspond to remote server 120 and the network can correspond to network 130.

When used in a LAN networking environment, the computer 20 is connected to the local network 51 through a network interface or adapter 53. When used in a WAN networking environment, the computer 20 typically includes a modem 54 or other means for establishing communications over the wide area network, such as the Internet.

Moreover, the modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In various aspects, the systems and methods described herein may be implemented in software, in which the methods may be stored as one or more instructions or code on a non-volatile computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for providing a customized graphical user interface based on user inputs, the method comprising:
   provisioning a hotkey button within a graphical user interface (GUI) of a client device; and
   establishing a hotkey database comprising a plurality of customized hotkey buttons via a process comprising the steps of:
      executing a set of input collection modules upon a set of devices, each input collection module configured to receive inputs made by a user of a device of the set of devices via user interfaces of the device of the set of devices and store within a database accessible to the set of collection modules the received inputs in association with application data comprising an identity of a software application being used by the user when the received inputs were generated and a timestamp relating to when the received inputs were made;
      executing an analysis module which executes a process comprising the steps of:
         analysing the stored received inputs and application data within the database to establish a sequence of inputs;
         determining if occurrences of the established sequence of events meet a threshold;
         upon a positive determination that the occurrences meet the threshold querying the hotkey database to determine whether the established sequence of events is already within the hotkey database;
         upon a negative determination that the established sequence of events is already within the hotkey database performing the steps of:
            establishing a GUI element to associate with a new customized hotkey button;
            establishing a human readable label to associate with the new customized hotkey button; and
            storing the indication of the GUI element and the human readable label as the new customized hotkey button in the hotkey database; wherein
   provisioning the hotkey button comprises:
      detecting a user of the client device executing an application;
      establishing an identity of the application;
      establishing a device identity of the client device;
      selecting from the hotkey database comprising the plurality of customized hotkey buttons a set of customized hotkey buttons in dependence upon the identity of the application and the device identity where the hotkey button is one of the set of customized hotkey buttons;
      rendering the set of customized hotkey buttons within the GUI of the client device; and
   each customized hotkey button of the set of customized hotkey buttons comprises a GUI element and a human readable label;
   selection of the GUI element associated with a customized hotkey button causes the application to execute a predetermined set of actions;
   the predetermined set of actions are established by simulating a predetermined sequence of inputs to one or more user interfaces of the client device;
   the application is either executing solely upon the client device or upon another remote server as an active session to which the client device is connected.

2. The method according to claim 1, wherein
   each input collection module of the set of input collection modules transmits the received inputs and the application data from its associated device of the set of devices to a remote server for storage within the remote database; and
   the analysis module is executed upon the remote server.

3. The method according to claim 1, wherein
   the steps of analysing the stored received inputs and application data and determining if occurrences of the established sequence of events meet a threshold performed by the analysis model are performed for a subset of the set of devices executing the set of input collection modules;
   each device within the subset of the set of devices meet a criteria; and
   the criteria is selected from the group comprising:
      the device is within a predetermined country;
      the device is associated with a company; and
      the device is a specific device type.

4. The method according to claim 1, wherein
the predetermined sequence of inputs simulated as the predetermined set of actions of a hotkey button comprise:
- a first portion comprising a sequence of keystrokes associated with a predetermined hotkey; and
- a second portion comprising one or more other inputs made by a user of the client device via one or more user interfaces of the client device;

the predetermined hotkey is a predetermined hotkey is at least one of an operating system of the client device and an application currently being executed by the client device; and the predetermined sequence of inputs made with one or more user interfaces of the client device are one of a combination of mouse strokes, a combination of joystick movements, and a combination of at least one of touchscreen actions and touchscreen motions.

5. The method according to claim 1, wherein
the predetermined sequence of inputs simulated as the predetermined set of actions of a hotkey button comprise:
- a first portion comprising a sequence of keystrokes associated with a predetermined hotkey; and
- a second portion comprising one or more other inputs made by a user of the client device via one or more user interfaces of the client device;

the predetermined hotkey is a predetermined hotkey is at least one of an operating system of the client device and an application currently being executed by the client device; and the predetermined sequence of inputs made with one or more user interfaces of the client device are one of a combination of keystrokes upon a physical keyboard or keystrokes upon a virtual keyboard rendered within the GUI.

6. One or more non-transitory storage media storing computer executable instructions, the computer executable instructions when executed by one or more processors cause the one or more processors to execute a series of steps comprising:
- provisioning a hotkey button within a graphical user interface (GUI) of a client device; and
- establishing a hotkey database comprising a plurality of customized hotkey buttons via a process comprising the steps of:
  - executing a set of input collection modules upon a set of devices, each input collection module configured to receive inputs made by a user of a device of the set of devices via user interfaces of the device of the set of devices and store within a database accessible to the set of collection modules the received inputs in association with application data comprising an identity of a software application being used by the user when the received inputs were generated and a timestamp relating to when the received inputs were made;
  - executing an analysis module which executes a process comprising the steps of:
    - analysing the stored received inputs and application data within the database to establish a sequence of inputs;
    - determining if occurrences of the established sequence of events meet a threshold;
    - upon a positive determination that the occurrences meet the threshold querying the hotkey database to determine whether the established sequence of events is already within the hotkey database;
    - upon a negative determination that the established sequence of events is already within the hotkey database performing the steps of:
      - establishing a GUI element to associate with a new customized hotkey button;
      - establishing a human readable label to associate with the new customized hotkey button; and
      - storing the indication of the GUI element and the human readable label as the new customized hotkey button in the hotkey database; wherein provisioning the hotkey button comprises:
- detecting a user of the client device executing an application;
- establishing an identity of the application;
- establishing a device identity of the client device;
- selecting from the hotkey database comprising the plurality of customized hotkey buttons a set of customized hotkey buttons in dependence upon the identity of the application and the device identity where the hotkey button is one of the set of customized hotkey buttons;
- rendering the set of customized hotkey buttons within the GUI of the client device; and each customized hotkey button of the set of customized hotkey buttons comprises a GUI element and a human readable label;

selection of the GUI element associated with a customized hotkey button causes the application to execute a predetermined set of actions;

the predetermined set of actions are established by simulating a predetermined sequence of inputs to one or more user interfaces of the client device;

the application is either executing solely upon the client device or upon another remote server as an active session to which the client device is connected.

* * * * *